United States Patent [19]
Horkin et al.

[11] Patent Number: 5,619,211
[45] Date of Patent: Apr. 8, 1997

[54] POSITION LOCATING AND COMMUNICATION SYSTEM USING MULTIPLE SATELLITE CONSTELLATIONS

[75] Inventors: Philip R. Horkin, Phoenix; Stephen C. Ma, Mesa; Isaac N. Durboraw, III, Scottsdale; George W. Muncaster, Phoenix, all of Ariz.

[73] Assignee: Motorola, Inc., Schaumburg, Ill.

[21] Appl. No.: 341,244

[22] Filed: Nov. 17, 1994

[51] Int. Cl.⁶ .............................. G01S 5/02; H04B 7/185
[52] U.S. Cl. ..................... 342/357; 342/352; 342/356
[58] Field of Search ................................. 342/356, 357, 342/352; 244/158 R, 159

[56] References Cited

U.S. PATENT DOCUMENTS

| | | | |
|---|---|---|---|
| 3,836,969 | 9/1974 | Bond et al. | 343/100 ST |
| 4,004,098 | 1/1977 | Shimaski | 179/15 BS |
| 4,691,882 | 9/1987 | Young | 244/158 R |
| 5,160,935 | 11/1992 | Inamiya | 342/357 |

FOREIGN PATENT DOCUMENTS

| | | | |
|---|---|---|---|
| 1176966 | 7/1989 | Japan | 342/351 |

OTHER PUBLICATIONS

An article "A Wireless World" by George Mannes, *Popular Mechanics*, Sep. 1994, pp. 67–70.
An article entitled "Efficient Spacing of Synchronous Communication Satellites" by Harrison. E. Rowe et al., *The Bell System Technical Journal*, Dec. 1968, pp. 2379–2433.
An article entitled "Proceedings Letters" from *Proceedings of the IEEE*, Sep. 1969, pp. 1655–1656.
Cline et al, "Quasicircular Ground Tracks For Geosynchronous Earth Satellites" J. Spacecraft, Bol. 23, No. 2, Mar.–Apr. 1986, pp. 144–148.
Shinji et al, "Orbit Allocation of Domestic Communications Satellites", Proc. of the IEEE, Sep. 1969, pp. 1655–1656.

*Primary Examiner*—Gregory C. Issing
*Attorney, Agent, or Firm*—Kevin K. Johanson; Robert M. Handy

[57] ABSTRACT

A communication and position locating system (2) suitable for air traffic control is described. Multiple satellites (40) are provided in two geosynchronous constellations. One constellation (e.g., 4 satellites) has a first closed ground track (14). The other (e.g., 2 satellites (161, 182)) has a different ground track (18) or is geostationary, located outside of the first ground track (14). Geolocation information is transmitted by the satellites (40) to aircraft (28) and ground stations (26) so that aircraft (28) can determine their current position. A pseudo range correction map is provided to the aircraft (28) by the base stations (26) to permit differential geolocation measurements. The satellites (40) include communication transceivers (80) so that aircraft (28) can communicate voice and data to other aircraft (28) and to the ground stations (26, 30, 32) and automatically report their position to air traffic control centers (30), e.g., via the satellites (40). High positional accuracy over large geographic areas is obtained.

11 Claims, 10 Drawing Sheets

POSITION LOCATING AND COMMUNICATION SYSTEM USING MULTIPLE SATELLITE CONSTELLATIONS

FIELD OF THE INVENTION

The present invention concerns an improved means and method for providing position location and communications for aircraft and other users.

BACKGROUND OF THE INVENTION

Air traffic control (ATC) systems rely on assembling and managing accurate information on aircraft location and course within specified zones and in communicating data, voice and other information to and from such aircraft. ATC includes at least communications, navigation and surveillance functions. ATC seeks to answer the questions: where is each aircraft in space and time, where is it going and how do you send it voice and data to provide route guidance, weather and safety alerts, landing instructions and, if necessary, instrument landing functions. The required accuracy of aircraft location information varies greatly depending upon the control function being performed. For example, in the case of general aircraft routing control one needs to know the aircraft location only within an accuracy of about $10^3$ meters, while for computer controlled instrument landings one needs to know aircraft position to about one meter.

Present day ATC systems use ground based radar to determine aircraft position in three dimensions, transponders to provide aircraft identification and various communication radio systems to exchange voice and other messages with the aircraft. Instrument landings can only be made at airports equipped with local, radar based, instrument landing systems. Various radio beacons are provided along major flyways so that pilots or on-board navigators can tell their general locations and whether or not they are within an assigned flyway. Some problems with present day ATC systems are that it is difficult or impossible to: (i) provide wide area coverage with uniform resolution, i.e., to track all aircraft with uniform high precision over a large geographic area without a substantial increase in the network of ground radar stations, (ii) provide emergency instrument landing capability at emergency (or other) airfields that do not have local instrument landing systems, (iii) have automatic, wide area reporting of accurate aircraft locations to ATC stations, (iv) have uninterrupted communication capability anywhere within the wide area and (v) have a single integrated system which provides, over wide areas, all of the communication, navigation and surveillance functions required by ATC. As used herein, "wide area" singular or plural, is meant to refer to regions encompassing on the order of $10^5$–$10^7$ km$^2$ or more.

The advent of the Global Positioning System (GPS) satellite network and the development of inexpensive GPS receivers has opened new possibilities for wide area air traffic control. Unfortunately the existing GPS system was developed primarily for military purposes and has significant limitations when used for ATC purposes. For example, there are times when the angular relationship between satellites in the GPS satellite constellation is such that accuracy of position fix is degraded by geometry, particularly in the event of a satellite outage. Another weakness of the existing GPS system is the great difficulty in and time required for replacing failed satellites. A further weakness is the lack of assurance that the existing GPS system will be operated at its maximum accuracy all of the time. Further, even under the best of conditions, it is very difficult with GPS to obtain the desired one meter accuracy over large geographic areas. Thus, the reliability, availability and accuracy of the present GPS system leaves much to be desired for ATC purposes.

DETAILED DESCRIPTION OF THE PREFERRED EMBODIMENT

The invented system and method are usable anywhere that the signals from the satellites described herein can be received. The words "user" and "aircraft", singular or plural, are employed interchangeably herein to refer to any object or vehicle, moving or stationary, in space or air or on land or water, and not merely to airplanes alone. Accordingly, "user" and "aircraft" include any object within radio range of the satellites of the present invention which contains or couples to a radio receiver and information processor for detecting and interpreting the satellite signals to determine, among other things, the object's position.

As used herein the word "geosynchronous" is intended to refer to satellite orbits having a substantially 24-hour orbital period (i.e., a sidereal day) so that the satellite either remains substantially above a predetermined location on the earth's surface (i.e., geostationary) or describes a closed ground track on the earth's surface which encompasses only part of the earth's surface. Geosynchronous or substantially geosynchronous satellites generally follow circular or elliptical orbits in space surrounding the earth. At the end of each sidereal day, the geosynchronous satellite lies above substantially the same point on the earth's surface as it did a sidereal day earlier. As used herein, the words "ground track", singular or plural, are intended to refer to that hypothetical path on the surface of the earth traced by the intersection of a vector extending from the center of the earth to the satellite, as the satellite moves around its orbit and the earth rotates.

Figure 1:
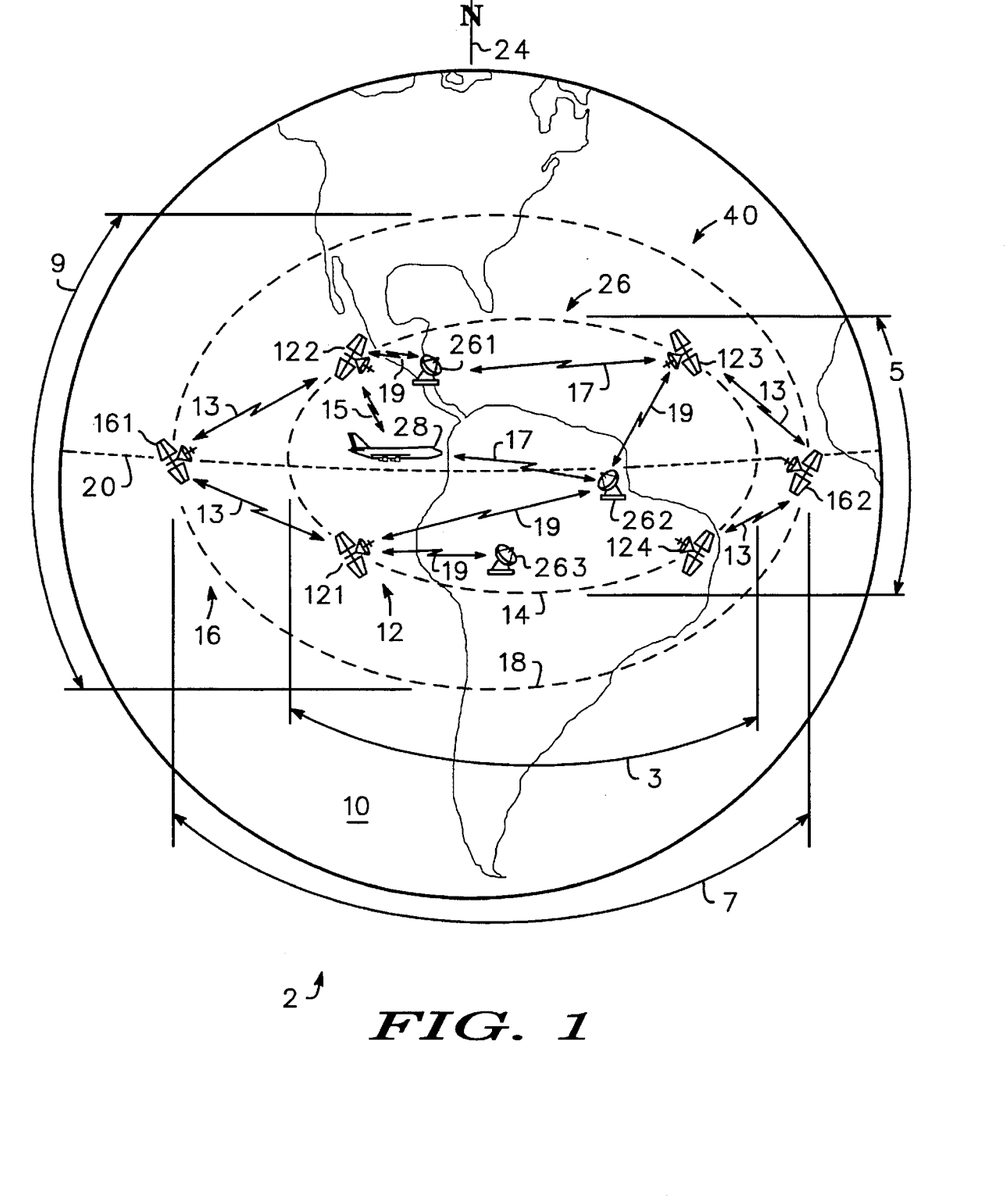
FIG. 1 is a simplified representation of the Earth and navigation and communication satellites in orbit around the Earth and their ground tracks, according to a preferred embodiment of the present invention.
Figure 2:
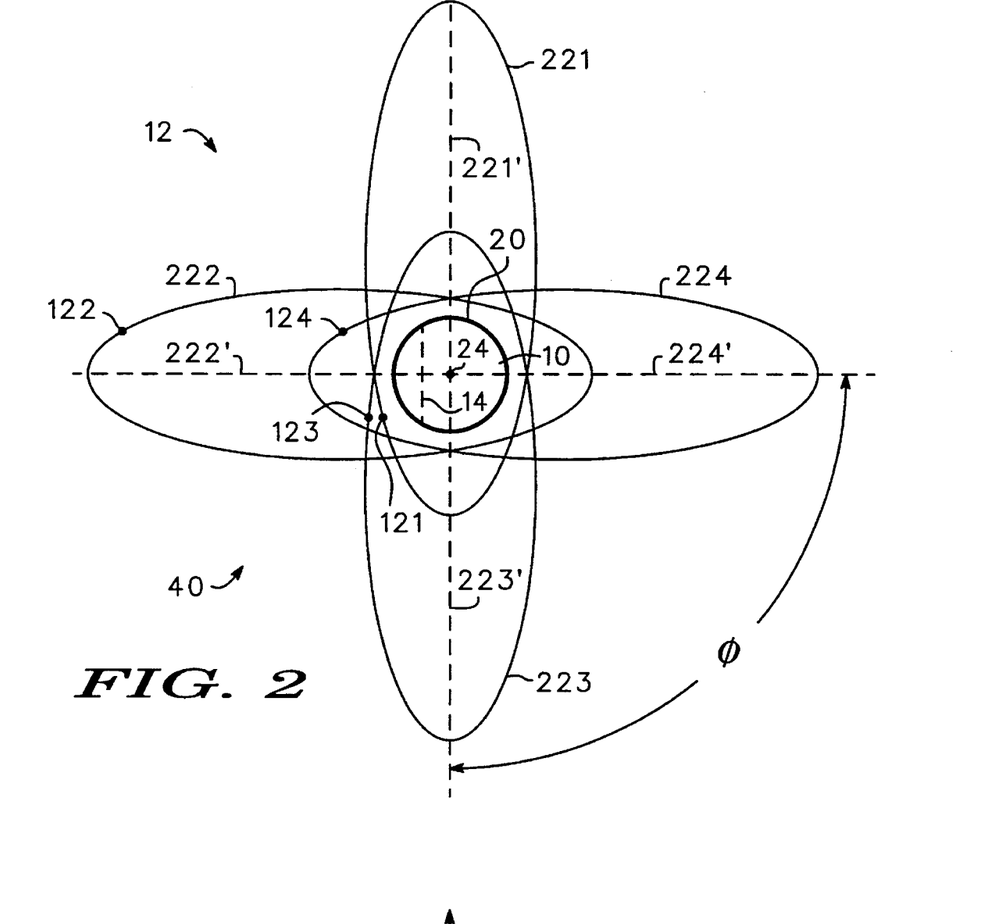
FIG. 2 is a view looking toward the north pole of the earth showing eccentric orbits of one of the two satellite constellations shown in FIG. 1, but not to scale.
Figure 3:
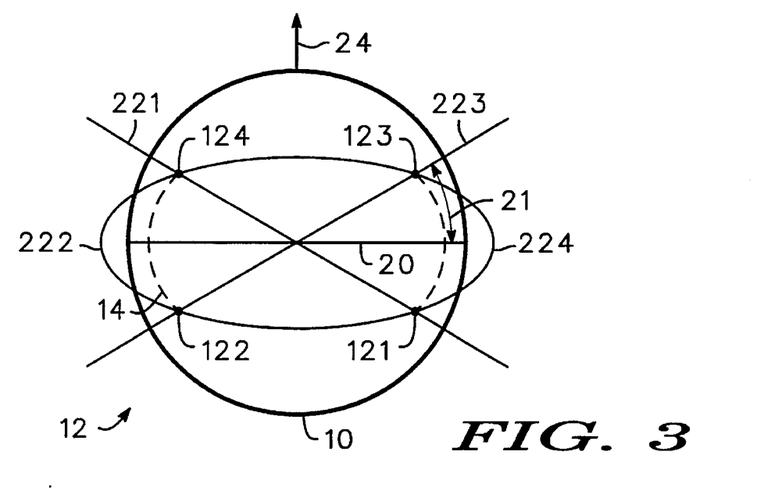
FIG. 3 is a view looking toward the equatorial plane of the earth showing the eccentric orbits of FIG. 2, but not to scale.

FIG. 1 shows a representation of earth 10 with air traffic control (ATC) system 2 comprising first satellite constellation 12 and second satellite constellation 16 in substantially geosynchronous orbits. FIGS. 2 (polar view) and 3 (equatorial view) show highly simplified illustrations of preferred orbits of constellation 12. Neither of FIGS. 2–3 is to scale or intended to accurately show the sizes of the orbits relative to each other, the earth or the satellite ground tracks. System 2 can be used for things besides air traffic control and the words "air traffic control" and the abbreviation "ATC", as used herein, are intended to include any uses of system 2, its satellites and base stations.

For convenience of explanation, constellation 12 is depicted as containing four satellites and constellation 16 as containing two satellites, but either constellation can contain fewer or more satellites provided that the total number of satellites visible to the user is sufficient to permit determination of the user's position based on signals received from the combination of satellites. Accordingly, the description of four satellites in constellation 12 and two satellites in constellation 16 is not intended to be limiting, but merely exemplary.

Referring to FIGS. 1–3, satellite constellation 12 comprises satellites 121, 122, 123, 124, which lie in inclined orbits 221, 222, 223, 224 with respect to the earth's equatorial plane 20 and moving in geosynchronous orbits. Geosynchronous orbits 221, 222, 223, 224 are conveniently (but not essentially) of the same shape and inclination angle 21 with respect to the equatorial plane and oriented in space so that the projections 221', 222', 223', 224' of their major axes on equatorial plane 20 are spaced apart by equal angles $\varnothing=360/4=90°$. In general, where there are N satellites in constellation 12, it is desirable that $\varnothing=360/N$. Any number of satellites 121–12N may comprise constellation 12, but at least three and, more preferably, four satellites are desirable.

Depending upon the orbital parameters chosen, satellites 121–12N can have the same ground track on the earth's surface. The ground track can be circular, elliptical or have various symmetrical or asymmetrical closed shapes (e.g., figure-eight, tear drop, bow-tie, etc.). For convenience of explanation, constellation 12 is illustrated in FIG. 1 as having elliptical ground track 14 of longitudinal width 3 and latitudinal height 5. The size, shape and location of ground track 14 depends upon the angle of inclination and other parameters of the orbits of satellites 121–12N in constellation 12 in a manner well known in the art. Longitudinal widths in the range of 30–180 degrees are useful with 40–100 degrees being more convenient and 50–70 degrees being preferred. Latitudinal height is generally chosen based on the northern and southern limits of the desired area of coverage, with generally about the same ranges of degrees being applicable. Inclined orbits are suitable with an inclination with respect to the equatorial plane in the range of 10–70 degrees being useful with 20–40 being convenient and 25–35 degrees being preferred.

An example of a typical set of orbital parameters is: (i) an inclination angle with respect to the equatorial plane (see angle 21 in FIG. 3) of about 30°, (ii) an eccentricity of about 0.28 (eccentricity=$((A^2-B^2)/A^2)^{1/2}$, where A and B are the half lengths of the major and minor axes, respectively), (iii) an altitude at perigee of about $23.8\times10^6$ m, (iv) and an altitude at apogee of about $47.3\times10^6$ m, and (v) an argument of perigee (angle between the ascending node and perigee) of about 90°. This defines one of orbits 221–22N. The other orbits are oriented as shown in FIG. 2 at azimuthal angles of 360/N around polar vector 24. When the above noted orbital parameters are applied to four satellites arranged as shown in FIG. 2, this produces elliptical ground track 14 which is approximately centered on the equator and has width 3 (see FIG. 1) of about 63° of longitude and height 5 (see FIG. 1) of about 60° of latitude (e.g., ±30° from the equator).

Second constellation 16 describing ground track 18 and comprising satellites 161, 162 is also provided. The depiction of only two satellites 161, 162 in constellation 16 is merely for convenience of explanation and not intended to be limiting. Any number of satellites 161–16M can be provided in constellation 16. Where constellation 12 contains three or more satellites, it is desirable that constellation 16 contain at least one and, more preferably, two satellites, that is, about half the number of satellites as in constellation 12. However, the ratio of the number of satellites in constellations 12 and 16 can be reversed, that is, constellation 16 can have more satellites than constellation 12. The preferred arrangement is at least four satellites in constellation 12 and at least two satellites in constellation 16 or vice-versa.

Constellation 16 describes ground track 18 having, in general, longitudinal width 7 and latitudinal height 9. The discussion of orbital arrangements of the satellites of constellation 12 applies as well to the satellites of constellation 16, but with orbital parameters modified so that ground track 18 preferably lies everywhere outside of ground track 14. This is desirable to insure that the relative positions of the satellites with respect to the user are such that good positional fixes can be obtained anywhere in the covered region at any time, i.e., there are no indeterminate locations or times.

Depending upon the orbital parameters, ground track 18 can be any closed path. In a preferred embodiment, the orbital plane of constellation 16 is arranged to be substantially parallel to equatorial plane 20. Satellites 161, 162 of constellation 16 are moving in geosynchronous orbits. When their orbital planes are parallel to the equatorial plane, their ground tracks contract to two points and satellites 161, 162 appear to remain substantially fixed above predetermined locations on the equator, as shown in FIG. 1, i.e., they are substantially geostationary. When satellites 121–124 of constellation 12 have orbits as illustrated in the example provided above, then, satellites 161–162 of second constellation 16 are desirably geostationary above the equator at locations on either side of ground track 14. Satellites 161, 162 are typically spaced about 10° to 15° of longitude on either side of ground track 14 but may have larger or smaller spacings, depending upon width 3 of ground track 14. In general, width 7 should not exceed about 160° of longitude.

For convenience of explanation, satellites 121–12N in constellations 12 and satellites 161–16M in constellation 16 are referred to generally as "satellites 40" (see FIG. 5 for an example of a typical satellite) and base stations 261–26N are referred to generally by reference number 26. Referring again to FIG. 1, satellites 40 communicate with each other directly over inter-satellite pathways 13, with aircraft 28 over pathways 15 and with ground stations 261, 262, 263 over pathways 19. There may be any number of ground base stations 261–26N, which for convenience are collectively referred to as "ground stations 26". Ground stations 26 may also communicate with plane 28 over pathways 17. For simplicity, only a few of these multiple communication links or pathways 13, 15, 17, 19 are included in FIG. 1, but, in general, all of satellites 40 can communicate with all of ground base stations 26 over paths 19, and can communicate with one or more aircraft 28 over paths 15 and can communicate with each other over inter-satellite pathways 13. Aircraft 28 can communicate with ground stations 26 over pathways 17, but generally only directly with those closest thereto. Communications between aircraft 28 and grounds stations 26 (or with other earth based stations or with other aircraft) conveniently occur via satellites 40.

Figure 4:
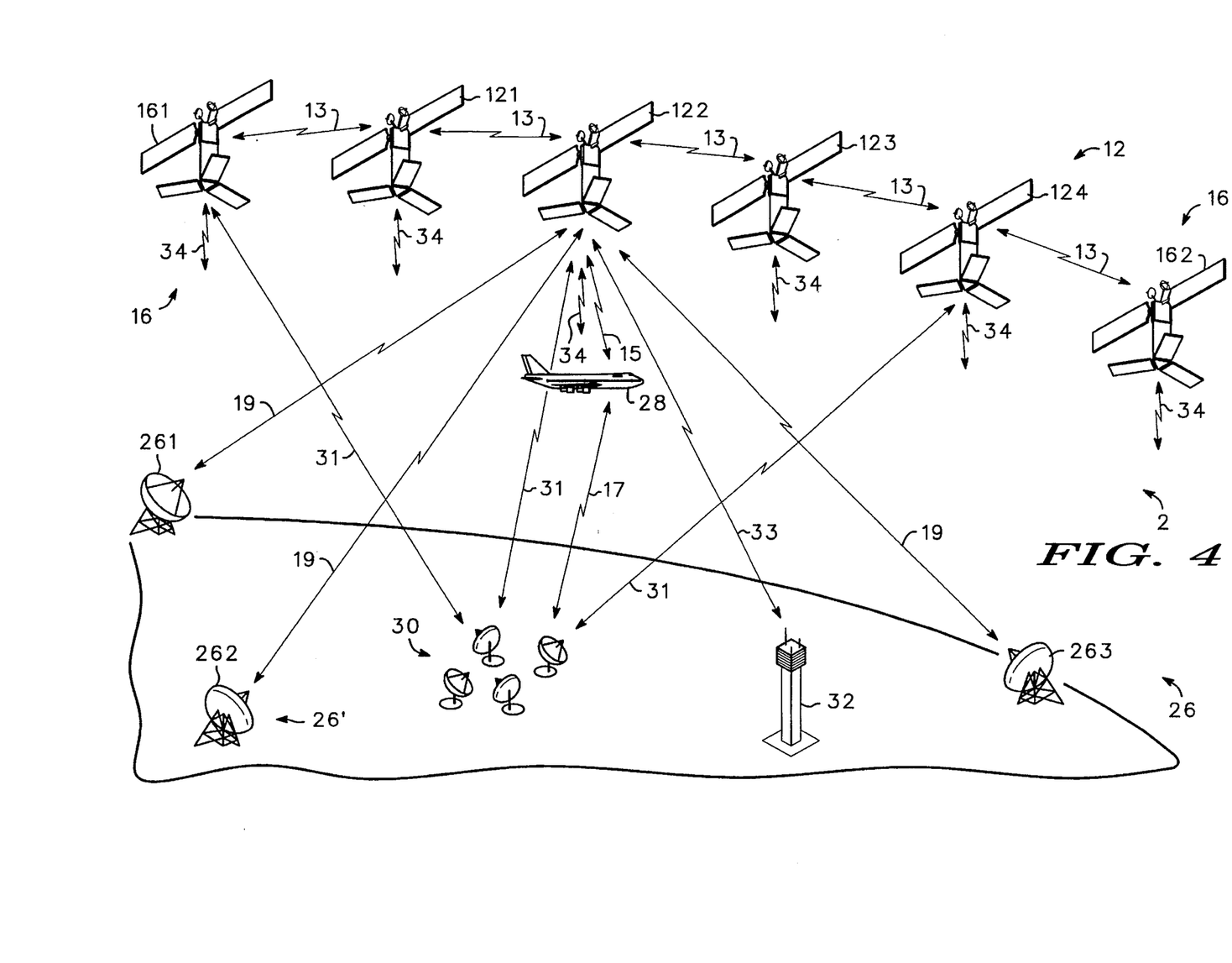
FIG. 4 is a simplified diagram illustrating how the satellites of the present invention send or exchange signals with various ground stations and aircraft and between satellites.

FIG. 4 is a simplified representation (not to scale) of ATC system 2 with exemplary satellites 40, showing various modes of communication between satellites of constellations 12 and 16 and various ground facilities and aircraft in order to provide communication, navigation and surveillance functions for ATC and other purposes. Satellites 40 communicate with other ground stations 30 and other facilities such as airport tower 32 over links 31, 33 similar to links 19 in FIG. 1. In addition to or as a part of communication links 13, 15, 17, 19, 31, 33, satellites 40 broadcast navigational information signals 34, referred to herein as "NAV DATA" (signals), which are received by aircraft 28 and ground stations 26. NAV DATA signals can also be received by ground stations 30, 32, but this is not important to the present invention.

Figure 5:
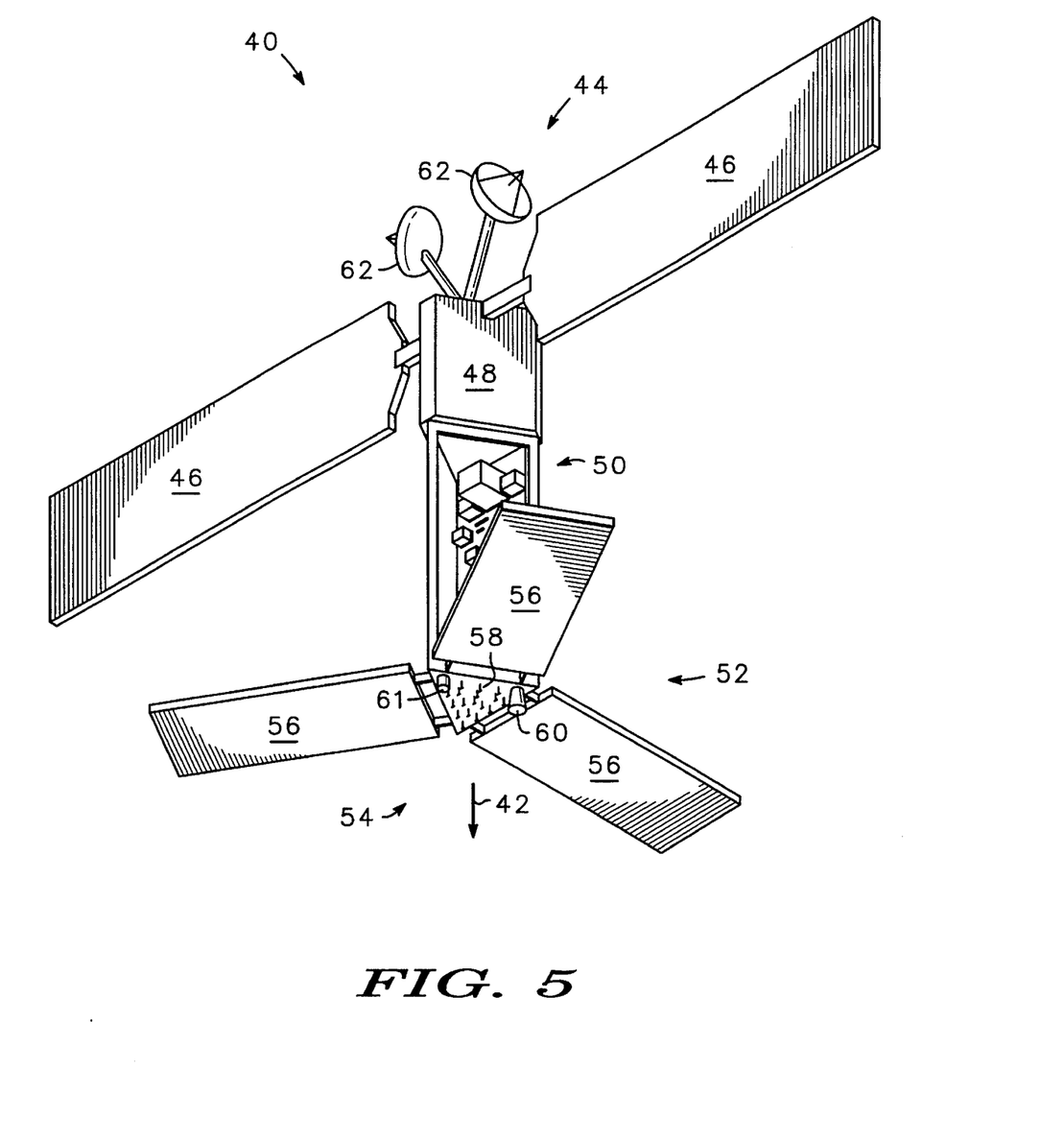
FIG. 5 is a simplified perspective view of a satellite according to a preferred embodiment of the present invention.

FIG. 5 is a simplified perspective view of exemplary satellite 40 representing any one of satellites 121–12N, 161–16M of constellations 12, 16. Satellite 40 is conveniently oriented in space as shown in FIG. 5 relative to vector 42 pointing toward the center of the earth. Satellite 40 conveniently comprises body 44 to which are attached solar arrays 46 for providing electrical power. Solar arrays 46 are preferably located at the end of satellite body 44 which is oriented away from earth. Satellite 40 conveniently has its propulsion and electrical power subsystems located in upper portion 48 and its communication and navigation payload in central portion 50 (shown in FIG. 5 with a protective panel removed to expose the interior of body 44). At earth oriented end 52 of satellite body 44, there are deployed various communication antennas 54. For example, phased array antenna 56 provides primary communication to aircraft 28, ground stations 26, 30, 32 and to other users. Navigation payload antenna 58 is provided for broadcasting NAV DATA. Antennas 60, 61, 62 are conveniently provided for telemetry, tracking, control and inter-satellite communication. Persons of skill in the art will understand how to design these various antennas based upon the frequencies chosen for communication and signaling and distances over which such communication and signaling is desired to occur. While FIG. 5 illustrates a particularly convenient design for satellites 40, other satellite configurations capable of the same function are also suitable.

Figure 6:
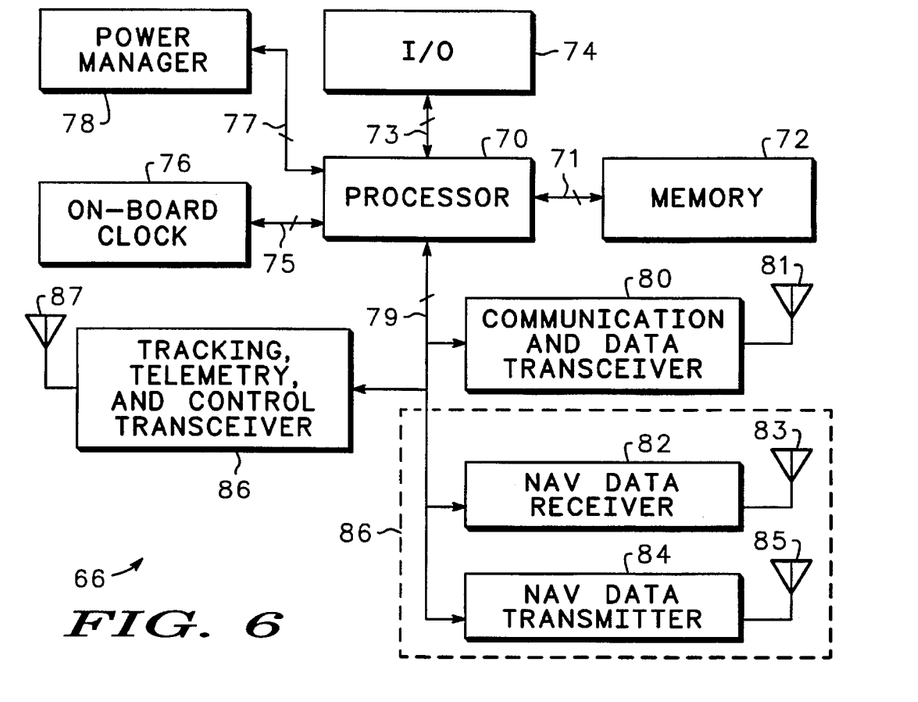
FIG. 6 is a simplified functional block diagram of a satellite electronic system according to a preferred embodiment of the present invention.

FIG. 6 is a simplified functional block diagram of communication and navigation electronics system 66 of satellite 40. Electronics system 66 comprises central processor 70 which is coupled by bus 71 to memory 72 in which program and data are stored. Processor 70 is coupled by a bus 73 to input-output (I/O) means 74 whereby various commands, programs, data and other information may be loaded via processor 70 into memory 72, and information coupled by processor 70 to other satellite subsystems. Processor 70 is coupled by bus 75 to on-board clock 76 and by bus 77 to power manager 78. Onboard clock 76 functions cooperatively with processor 70 to control the timing of various signals which are broadcast by electronics system 66 of satellite 40. Power manager 78 cooperates with processor 70 to minimize power consumption of electronics system 66 in order to conserve satellite energy, which is always a scarce resource in satellites. Processor 70 communicates over bus 79 with communication and data transceiver (radio) 80, NAV DATA receiver (radio) 82, NAV DATA transmitter (radio) 84 and telemetry, tracking and control transceiver 86, which are coupled respectively to antennas 81, 83, 85, 87. For convenience of explanation, radios 80, 82, 84, 86 are shown as being coupled to separate antennas 81, 83, 85, 87, but those of skill in the art will understand that antennas may be shared when radios operate on the same or compatible frequencies if that is desired. Further, NAV DATA receiver (radio) 82 and NAV DATA transmitter (radio) 84 and corresponding antennas 83, 85 may be combined into single NAV DATA transceiver (radio) 86 as indicated by the dashed line. While all satellites 40 will contain NAV DATA transmitters 84 and telemetry, tracking and control transceivers 86, it is not necessary that all satellites have communications and data transceivers 80 which are intended primarily for relaying communications between various ground stations and aircraft and between various aircraft via satellites 40. Transceiver 80 can also be also used for inter-satellite communication (generally via a separate antenna), but a separate transceiver can also be provided for that purpose. CDMA, TDMA, FDMA, AM and FM and combinations thereof are example of suitable modulation techniques for the signals being sent and received by the various transmitters, receivers and transceivers on satellites 40, planes 28 and ground stations 26, 30, 32.

Figure 7:
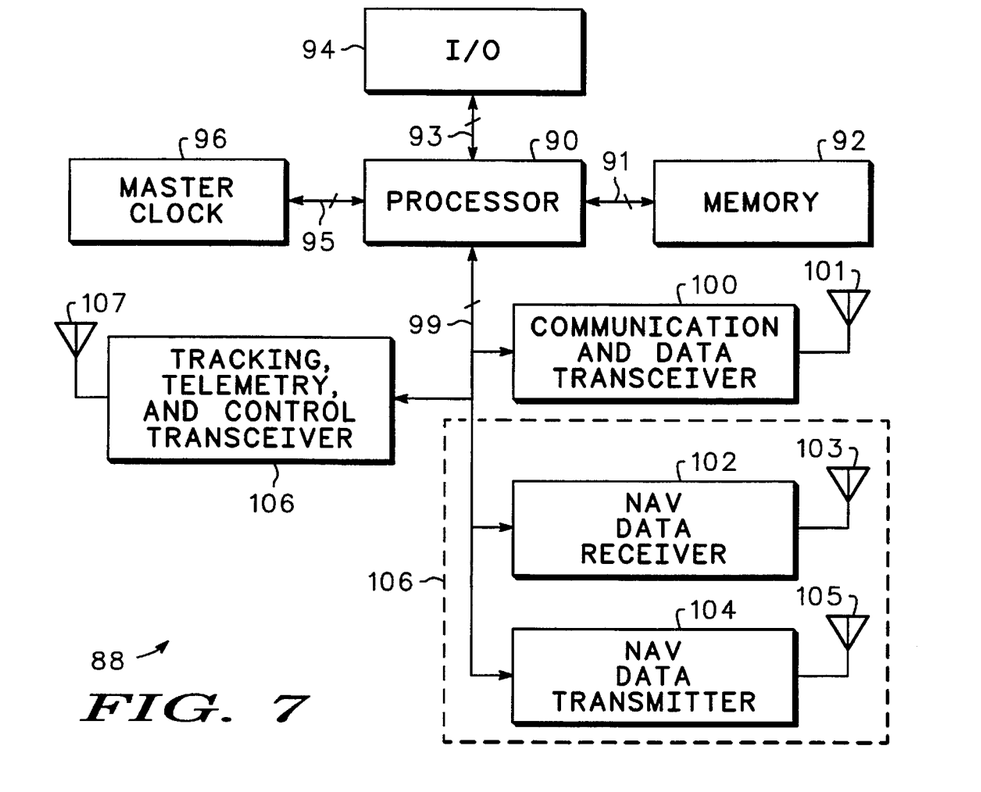
FIG. 7 is a is a simplified functional block diagram of a base station electronic system according to a preferred embodiment of the present invention.

FIG. 7 is a simplified functional block diagram of a communications and navigation electronics system 88 of base station 26 according to a preferred embodiment of the present invention. Electronics system 88 comprises processor 90 which controls the operation of electronics system 88 of base station 26. Processor 90 is coupled by bus 91 to memory 92 which contains programs and data. Processor 90 is coupled by bus 93 to input-output (I/O) means 94. I/O means 94 conveniently comprises data input devices such as, for example but not limited to, keyboards, wands, mice, and other means well known in the art, and presentation devices, as for example, various visual displays. I/O means 94 also desirably comprises ports for communicating with other base stations and other communication apparatus at the same or other locations. Processor 90 is coupled by a bus 95 to master clock 96 and via bus 99 to communication and data transceiver (radio) 100, NAV DATA receiver (radio) 102, NAV DATA transmitter (radio) 104 and telemetry, tracking and control transceiver 106, which are coupled respectively to antennas 101, 103, 105, 107. As noted in connection with FIG. 6, NAV DATA receiver 102 and NAV DATA transmitter 104 may be combined along with their antennas, as indicated by dashed line 108.

Master clock 96 of electronic system 88 of base station 26 differs from on-board clock 76 in satellite communication payload 66 in that, master clock 96 has significantly better long term stability. Cesium and rubidium atomic clocks are suitable for master clock 96. In contrast, on-board clock 76 can be a simple temperature control quartz crystal or other reference frequency source with comparable performance. As will be explained later, master clock 96 is used to periodically correct or compensate on-board clock 76 of each satellite 40. In general, multiple base stations 26 are provided. Of these, one base station is selected to act as master base station 26' whose clock 96 acts as the master clock for the entire base station-satellite system. The functions performed by electronic systems 66, 88 in FIGS. 6–7 are explained in more detail in connection with the flow charts of FIGS. 10–13, which describe their operation.

Figure 8:
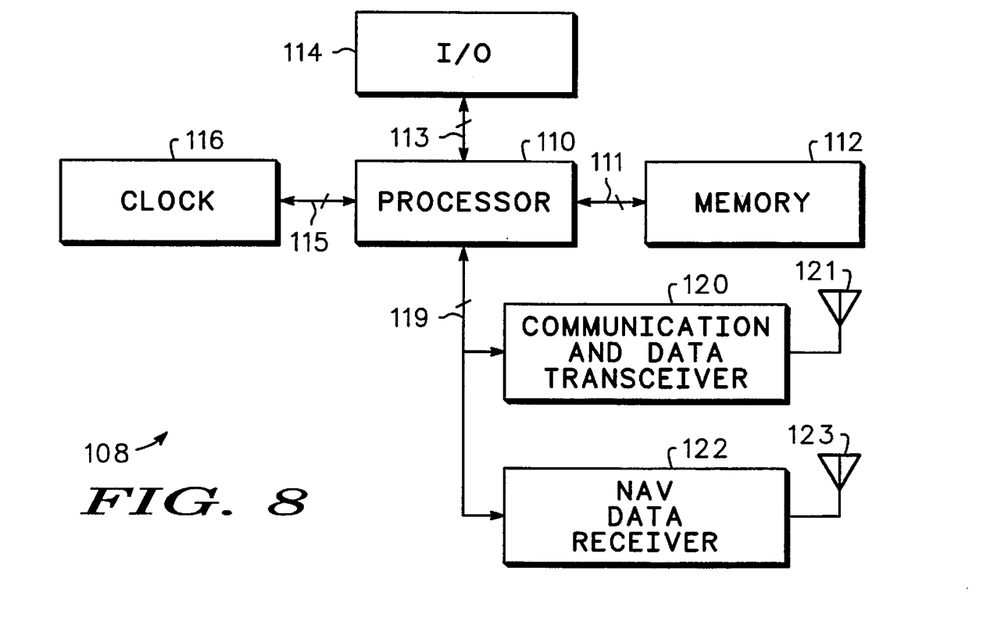
FIG. 8 is a simplified functional block diagram of an aircraft electronic system responsive to the satellites provided by the present invention.

FIG. 8 is a simplified functional block diagram of aircraft communication and navigation electronic system 108 responsive to the signals provided by, for example, satellites 40. Aircraft electronic system 108 comprises processor 110 which is coupled by bus 111 to memory 112 suitable for containing both programs and data. Processor 110 is coupled by bus 113 to input-output (I/O) ports and apparatus 114 suitable for use by the crew of the aircraft and other aircraft subsystems. Processor 110 is coupled by bus 115 to clock 116 and by bus 119 to communication and data transceiver (radio) 120 and NAV DATA receiver (radio) 122, which are in turn coupled to antennas 121, 123, respectively. The functions performed by aircraft electronic system 108 will be more fully understood in connection with the flow chart illustrated in FIG. 9. In addition to the functions described herein in connection with using NAV DATA to determine aircraft position and automatically transmit that to a monitoring station, aircraft electronic system 108 through use of suitable software known in the art performs course prediction (navigation), communication (sending and receiving messages from ATC centers and other planes) and various other well known operations within the capabilities of general purpose processor 110.

Figure 9:
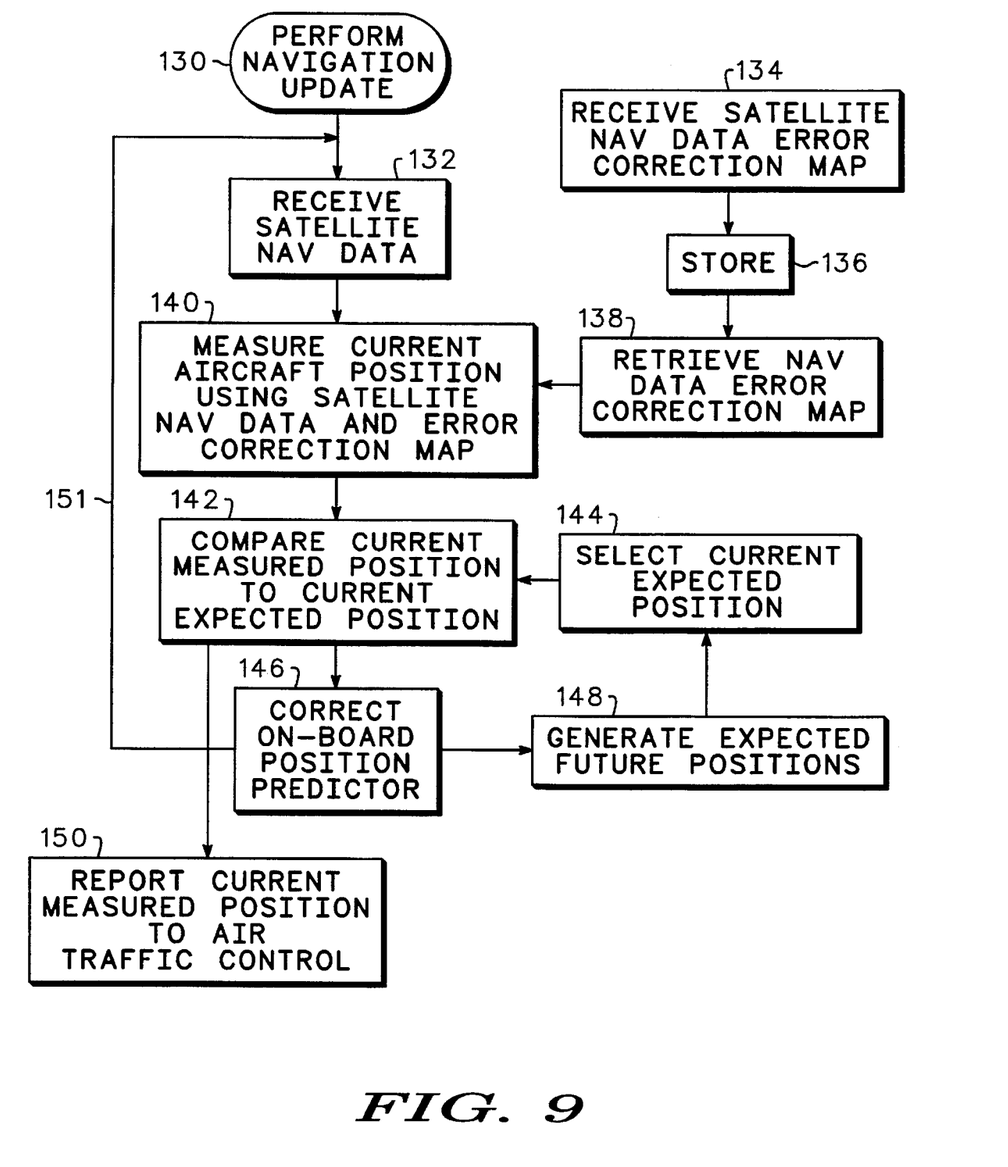
FIG. 9 is a simplified process flow chart illustrating how a receiving aircraft performs a navigation position update, using positional information ("NAV DATA") provided by the satellites.

FIG. 9 is a simplified process flow chart illustrating how electronic system 108 of receiving aircraft performs navigation position update process 130 using positional information ("NAV DATA") provided by satellites 40 of constellations 12, 16. "Perform navigation up-date" process 130 comprises step 132 in which NAV DATA receiver 122 (see FIG. 8) receives NAV DATA via antenna 123 from satellites 40. In the preferred embodiment, NAV DATA is the same as or similar to the positional informational signals provided by present day GPS satellites placed in orbit by the United States Government. It is advantageous to use positional information signals the same as or similar to the current GPS signals for NAV DATA since the technology for converting such signals into local position information is well developed. However, the optional dither signal which can be inserted by the United States Government in these GPS satellites, is omitted. A private encryption method may be included and a decryption device therefore provided to authorized users but not to unauthorized users. This is useful, for example, when access to the invented satellite ATC system is intended to be limited to sponsoring users who have helped defray its cost and not the public at large.

At the same time or previous to receiving satellite NAV DATA in step 132, aircraft electronic system 108 has received a satellite NAV DATA error correction map as indicated in step 134 and stored this map in local memory 112 as indicated in step 136. In step 138, the NAV DATA error correction map is retrieved and combined in step 140 with the received satellite NAV DATA obtained in step 132 to measure the current aircraft position using the satellite NAV DATA from step 132 and the error correction map from step 138. Step 132 is conveniently provided by NAV DATA receiver 122, step 134 is provided by communication and data transceiver 120, and steps 138 and 140 are carried out by processor 110 in cooperation with memory 112 and clock 116 of aircraft electronic system 108. Clock 116 of aircraft system 108 need not be a high precision clock since timing signals are obtained from satellite NAV DATA in the same way that they are extracted from present day GPS signals.

Aircraft electronic system 108 for determining aircraft position, operates in substantially the same manner that differential GPS measurements are made using present day GPS systems. In differential operation, the positional uncertainty that is inherent in NAV DATA signals received directly from satellites 40 in step 132 is corrected by using error data obtained from one or more base stations of precisely known geographic position (e.g., base stations 26) which are receiving substantially the same NAV DATA signals from the same satellites 40 at substantially the same time as the measuring aircraft. Satellites 40 are in substantially geosynchronous orbit at an average altitude of approximately $35 \times 10^6$ meters above the earth. Hence, the angular divergence of radio signals along satellite to base station pathways 19, and of radio signals along satellites to aircraft pathways 15, differ in angular orientation generally by at most a few degrees. As a consequence, differential corrections can be applied to satellite NAV DATA received at aircraft that are very large distances (e.g., $>10^6$ m) away from reference base stations providing the differential correction information. Differential corrections permit higher accuracy to be obtained. This is explained in more detail in connection with FIG. 11.

Referring again to FIG. 9, in step 142, the current measured position derived in step 140 from the information provided in steps 132 and 138 is compared to the current expected position selected from memory 112 in step 144. The output of step 142 is the navigational error, that is the difference between the expected current position being produced by the aircraft's navigation system and the actual position as measured using the combination of satellite NAV DATA and the error correction map described above. In step 146, this navigational error information is used to correct the on-board position predictor which is a part of the aircraft's navigation system. This is done either manually or automatically. Aircraft navigation systems include navigational software (e.g., running on processor 110 or elsewhere) which provides position predictions based on known past positions, and heading and speed information derived from on-board sensors. In step 148, the aircraft's navigational system or navigator generates and stores more accurate expected future positions or course track based on the position update, so as to be later retrieved in step 144 when a fresh set of NAV DATA has been received by electronic system 108 and a further update is to be performed.

At the same or subsequent time, the result of comparison step 142 is desirably used in step 150 to report the current measured position of the aircraft to air traffic control. It is especially desirable that reporting step 150 be done automatically and updated frequently, as for example, about once a minute. This is so that the ATC system can have high resolution and timely position (and course data) about each aircraft within its area of coverage. During critical maneuvers (e.g., some landings and takeoffs) more frequent update are desirable.

Reporting step 150 may be carried out by direct link 17 (see FIG. 1) between aircraft 28 and ground station 26, 30, 32 or via link 15, 19 or 15, 13, 19 by way of satellites 40.

The process recycles as indicated by path 151 to step 132 so as to begin to operate on the next set of satellite NAV DATA received by electronic system 108. A query step (not shown) may be inserted if desired in path 151 so that system 108 waits until receipt of a new set of satellite data has been confirmed before proceeding to once again automatically perform navigation up-date process 130.

A particular advantage of the present invention is that it automatically provides autonomous positional information to the ATC system which can be used in place of ground based radar data for surveillance. This permits the ATC system to know the whereabouts of aircraft in three dimensions to a high degree of accuracy (e.g., approaching one meter) throughout the wide coverage area (e.g., $10^5$ to $10^7$ km$^2$ or more) provided by the satellites in the described orbits. This combination of wide area coverage, high resolution throughout the coverage area and robust communications capability makes it possible for a remotely located ATC operator, who may be several thousand kilometers away, to land a plane by instruments at an air field that is not equipped with any local instrument landing system. This is a significant advantage for improved air traffic safety.

Figure 10:
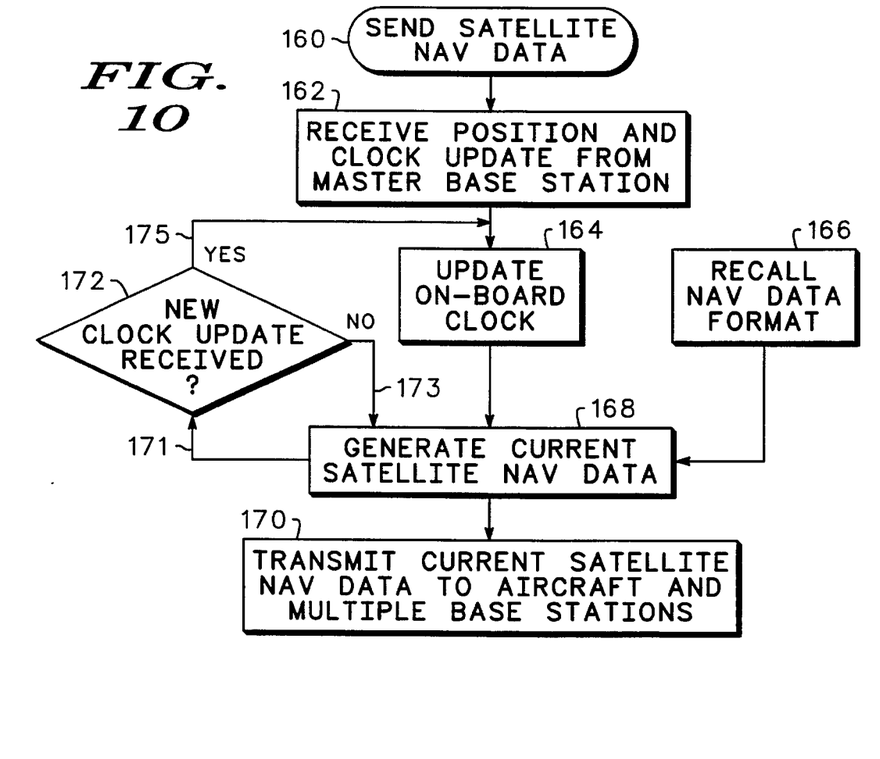
FIG. 10 is a simplified process flow chart illustrating how a satellite generates and sends NAV DATA to an aircraft.

FIG. 10 is a simplified process flow chart for "Send Satellite NAV DATA" process 160 illustrating how satellites 40 generate and sends NAV DATA to aircraft 28. "Send Satellite NAV DATA" process 160 comprises step 162 in which satellite 40 receives clock and position update data from master base station 26'. Master base station 26' is one of base stations 26 which has been designated to act as a master controller for all satellite on-board clocks 76. Generally, it is desirable to use the base station whose clock 96 shows the greatest time stability. However, all base stations 26 can have master clocks so that there is redundancy in the system and the duties of serving as master base station can be rotated.

The information received in step 162 is used in step 164 to update on-board clocks 76 (see FIG. 6) of satellite electronic system 66. In step 166, a predetermined format for NAV DATA is recalled from memory 72 of satellite electronic system 66. In step 168, the outputs of steps 164 and 166 are used to generate current satellite NAV DATA, for example, in substantially the same manner that satellite NAV DATA is generated by the existing GPS satellite systems using means well know in the art. While NAV DATA referred to herein is desirably similar to that employed by existing GPS satellites (because the technology associated therewith is well developed), any signal pattern which is capable of being decoded by receiving aircraft and ground stations to provide positional information of the same or higher accuracy can also be used. The NAV DATA format and the NAV DATA content will depend upon the user's needs for positional resolution and accuracy. Persons of skill in the art will understand, based on the descriptions given herein, how to select a NAV DATA format and NAV DATA content to provide NAV DATA having sufficient positional resolution and accuracy to suit their particular needs. It is desirable that the NAV DATA signals received from each satellite include a unique identifier or other means for distinguishing among them.

The current satellite NAV DATA generated in step 168 is transmitted in step 170 to aircraft 28 and base stations 26. As indicated by path 171, query step 172 is desirably performed to determine whether a new clock update has been received from the master base station. If the answer to the query is "NO" then as indicated by path 173, satellite system 66 continues to use the current on-board clock time to repeat steps 168 and 170. If the answer to query 172 is "YES", as indicated by path 175, the process cycles back to step 164 wherein the on-board clock is updated by the newly received clock update signal from master base station and a new set of satellite NAV DATA is generated based thereon in step 168 and sent to the aircraft 28 and base stations 26 once again in step 170. Process 160 (or a subset thereof via path 173) is preferably repeated continuously so that satellite NAV DATA is available on a substantially continuous basis to any aircraft operating within range of satellites 40.

Figure 11:
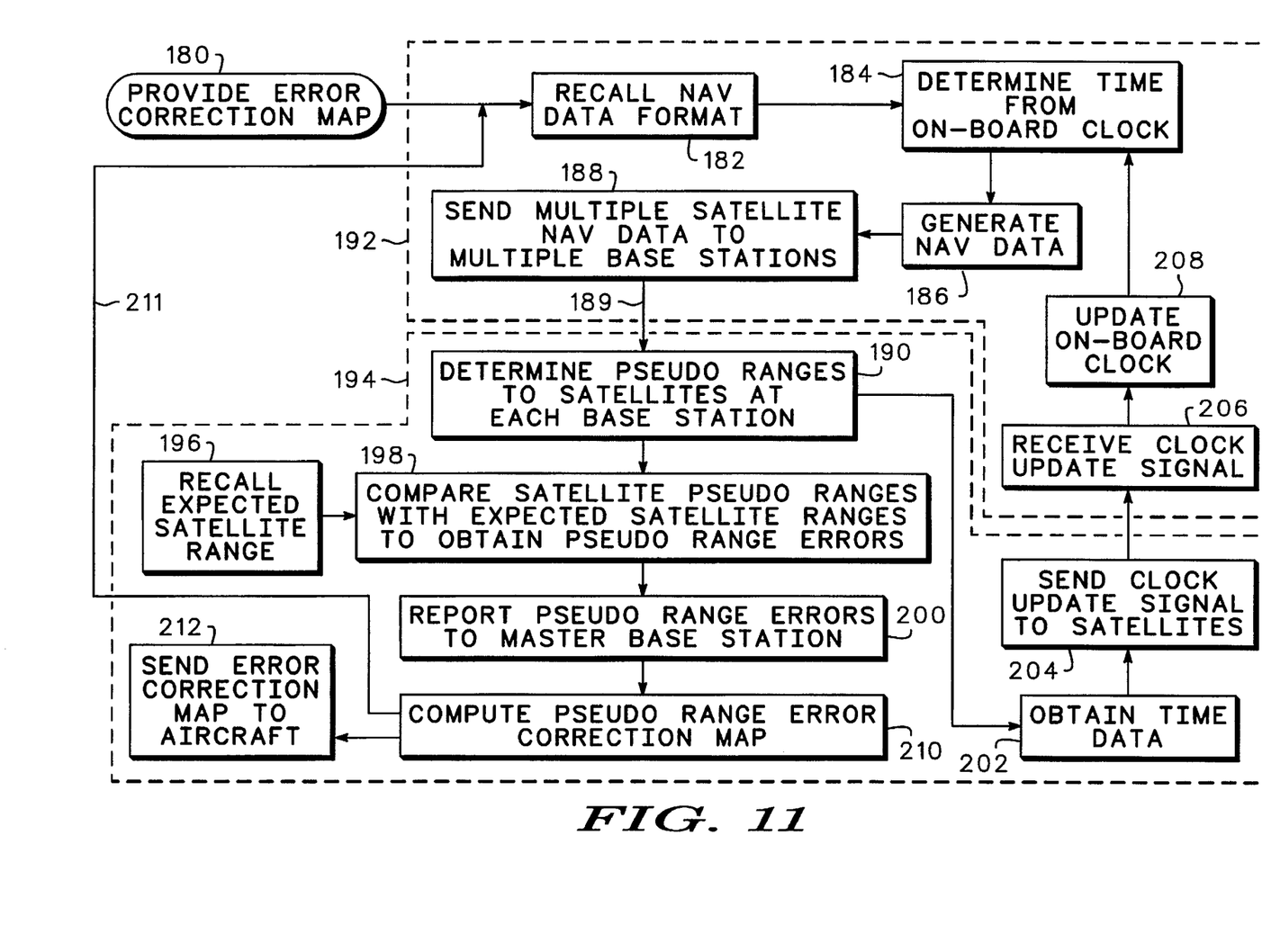
FIG. 11 is a simplified process flow chart illustrating how satellites and base stations cooperate to provide a positional information error correction map to aircraft receiving NAV DATA from the satellites.

FIG. 11 is a simplified process flow chart illustrating how satellites 40 and base stations 26 cooperate to carry out process 180 for providing an error correction map to aircraft 28 receiving NAV DATA from satellites 40. Process 180 in satellite 66 comprises step 182 similar to step 166 of FIG. 10 in which the NAV DATA format is recalled. In step 184, satellite electronics 66 determine time from onboard clock 76. Steps 182, 184 may be performed in any order or in parallel and the 182–184 sequence in FIG. 11 is intended merely for convenience of explanation and not to be limiting. Processor 70 (see FIG. 6) uses the information obtained in steps 182 and 184 to generate NAV DATA in step 186 in much the same manner that processor 70 generated current satellite NAV DATA in step 168 of FIG. 10. In step 188, satellites 40 broadcast satellite NAV DATA so that it can be received by base stations 26. It should be kept in mind in connection with the steps of process 160 illustrated in FIG. 10 and steps 182, 184, 186, 188 of process 180, that each of satellites 40 is performing substantially the same operations on a continuous basis, and transmitting NAV DATA appropriate to their own individual locations in inertial space. Thus, the NAV DATA sent in step 170 of FIG. 10 and in step 188 of FIG. 11 can be received from all satellites by all base stations and by any aircraft operating within the range of satellites 40 and equipped with the appropriate onboard electronics 108. The steps enclosed within dashed line 192 of FIG. 11 are being performed in satellites 40 and the steps enclosed in dashed line 194 of FIG. 11 are being carried out principally within base stations 26. Methods for signal tracking such as those employed in present day GPS receivers can be used to combine carrier phase and code discriminator information in order to generate precise pseudo range measurements. The coupling between satellites 40 and base stations 26 is established by radio communication over links 19 as illustrated by path 189 in FIG. 11. Step 188 of process 180 is carried out by the combination of processor 70, NAV DATA transmitter (radio) 84 and antenna 85 of satellite electronic system 66 as illustrated in FIG. 6.

Referring to FIGS. 7 and 11, antenna 103, NAV DATA receiver 102 and processor 90 of base station electronic system 88 receive NAV DATA signals from satellites 40 and determine, in step 190, the satellite pseudo ranges from the satellite NAV DATA. This occurs in each of base stations 26 for each of satellites 40. Processor 90 in cooperation with memory 92 of base station electronic system 88 periodically computes the expected satellite positions and ranges and in step 196, this information is recalled and in step 198 the expected satellite ranges and the measured pseudo ranges are compared to obtain the pseudo range and clock errors. In step 200, the errors determined by the individual base stations 261–26M are reported to a master base station 26'. In addition to the position information, the NAV DATA from each satellite contains information on time measured by the local satellite clock. Base station electronic system 88 compares the satellite time included in the NAV DATA with the time being kept by master clock 96 and in step 202 determines a time correction signal to correct or compensate on-board clock 76 of each satellite 40. In step 204 this correction or compensating signal is sent so that it may be received in step 206 and the on-board clocks corrected as indicated in step 208. Step 208 corresponds to the combination of steps 162, 164 of FIG. 10.

In step 210, processor 90 of master base station electronics system 88 uses the information it received in step 200 from each of the individual base stations, to prepare a map characterizing the NAV DATA errors for the geographical region over which satellites 40 are visible. The error map interpolates between the error data obtained at the various base stations 26. This is done in substantially the same manner in which current differential GPS receivers operate today, that is, computing the difference in the pseudo ranges obtained from the satellite NAV DATA to the actual ranges based on the high precision orbital model for the satellites stored in memory 92 and periodically updated by processor 90 by process 220 described in FIG. 12. The error map provides NAV DATA compensation for propagation path disturbances. First order errors due to satellite clock drift and ephemeris error are corrected by updating the satellite on-board clocks as described in connection with FIGS. 12–13, for example.

The combination of the above-described process with the choice of satellite constellations and orbits provides substantially uniform high positional accuracy (e.g., approaching one meter) over a wide area (tens to hundreds of millions of square kilometers) with very few satellites (e.g., 4–6) and very few reference base stations (e.g., 1–3). This result is not possible with present day GPS. A further advantage of the present invention is that it provides high position location integrity, i.e., no satellite geometries which prevent high reliable position determination. The satellite constellations and orbits described herein provide an uninterrupted ability to receive NAV DATA from four to six satellites in the coverage area at all times. This is not true of present day GPS.

Knowing the pseudo range errors at the three or more base stations within the region of interest, processor 90 is able, using means well known in the art, to compute anticipated pseudo range errors at locations in other portions of the satellite coverage area which are different than the exact base station locations. This results in the error correction map. In step 210, this error correction map is sent to aircrafts 28. Transmission of the error correction map (including appropriate time marks), can be accomplished by a direct transmission over pathway 17 or by indirect transmission via pathways 19 to one or more satellites and from satellites 40 via pathway 15 to aircraft 28, or by using any other available communication means. Since each error correction map has associated therewith a time mark based on master time clock 96, the precise transmission path does not affect the map accuracy.

As indicated by path 211, process 180 recycles. A time delay query (not shown) may be inserted in path 211 to control the time lapse between preparation of new error correction maps. Since the satellites of the present invention are moving much more slowly relative to users than the satellites in conventional present day GPS systems, there is no need to have minute-by-minute updating of the error correction map. It is estimated that updating the error correction map about once every two hours is sufficient to account for satellite motion. More frequent updates may be desirable to take into account weather fluctuations or during high solar flare activity or other anomalies.

Figure 12:
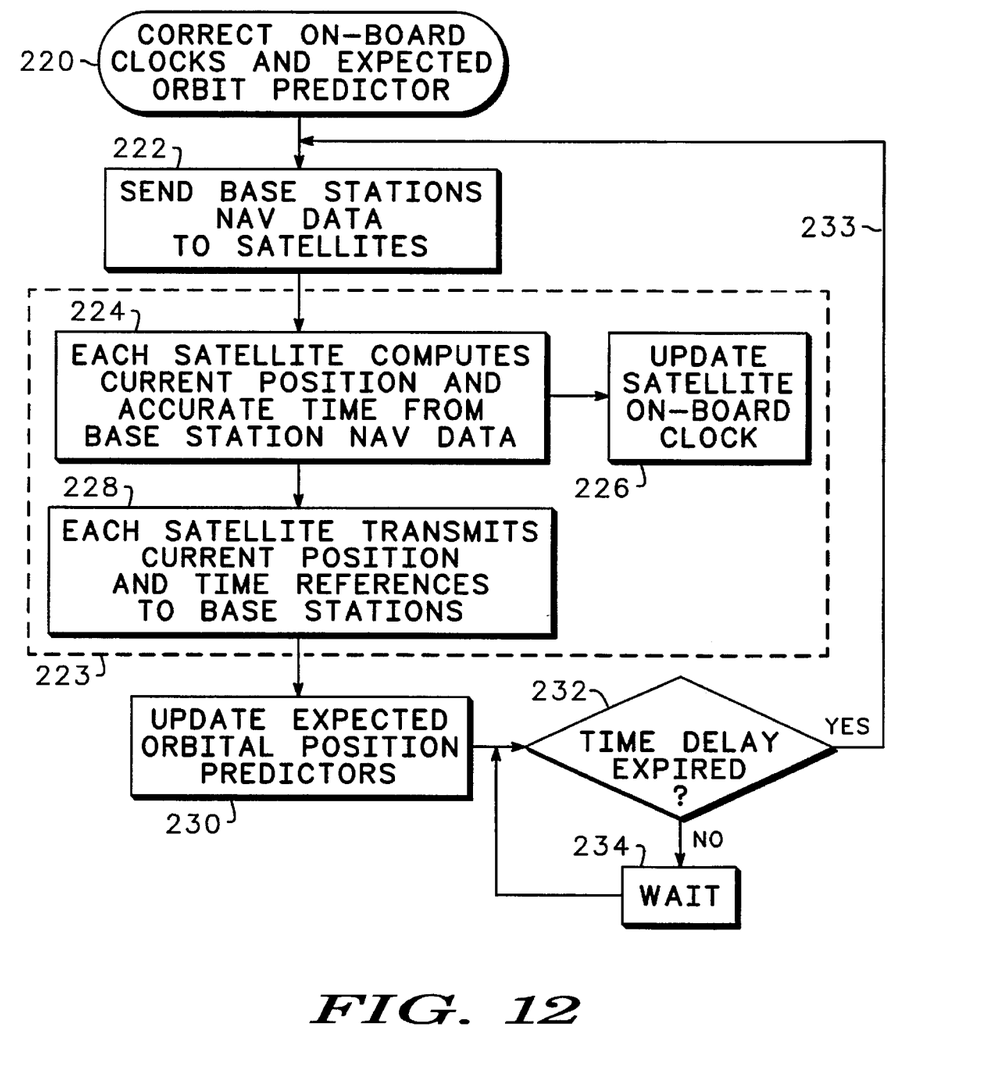
FIG. 12 is a simplified process flow chart illustrating how base stations and satellites cooperate to provide accurate time information for updating the on-board clocks on the satellites and to provide satellite position information to the base station, according to a first embodiment of the present information.

FIG. 12 is a simplified process flow chart illustrating process 220 whereby base stations and satellites cooperate to provide accurate time information for updating on-board clocks in the satellites and for providing satellite positional information to the base station so that the base station orbital predictor can be corrected, according to a first embodiment of the present invention. Process 220 comprises step 222 wherein base stations 26 all send base station NAV DATA to satellites 40. With at least three and preferably four base stations, positional information can be then calculated in the satellites. Those steps outside dashed outline 223 are carried out by base stations 26 and those steps inside dashed outline 223 are carried out in satellites 40. In step 224, each satellite computes its current position and accurate time data from base station NAV DATA (assuming four or more base stations). This calculation is carried out in the same manner that present day GPS receivers determine time and receiver position based on NAV DATA signals from the GPS satellites. In process 220, rather than signals going from satellites having known position to a ground based user whose position is to be measured, the signals are going from base stations having known positions to a satellite whose position is to be measured. In step 226, the onboard clock 76 is updated using the accurate time data generated in step 224 based upon master clock 96 of base station electronics 88. In step 228, each satellite transmits its current position and position time reference to base stations 26 and in step 230, this information is used to update the "expected orbital position predictors" being executed by processor 90 based on routines stored in program memory 92. Following step 230, time delay query 232 is provided to determine whether a time delay for repeating correction of the expected orbital predictor has expired or not. If not, then wait step 234 is introduced. If yes, then, as indicated by path 233, the process recycles and commences again at step 222.

Figure 13:
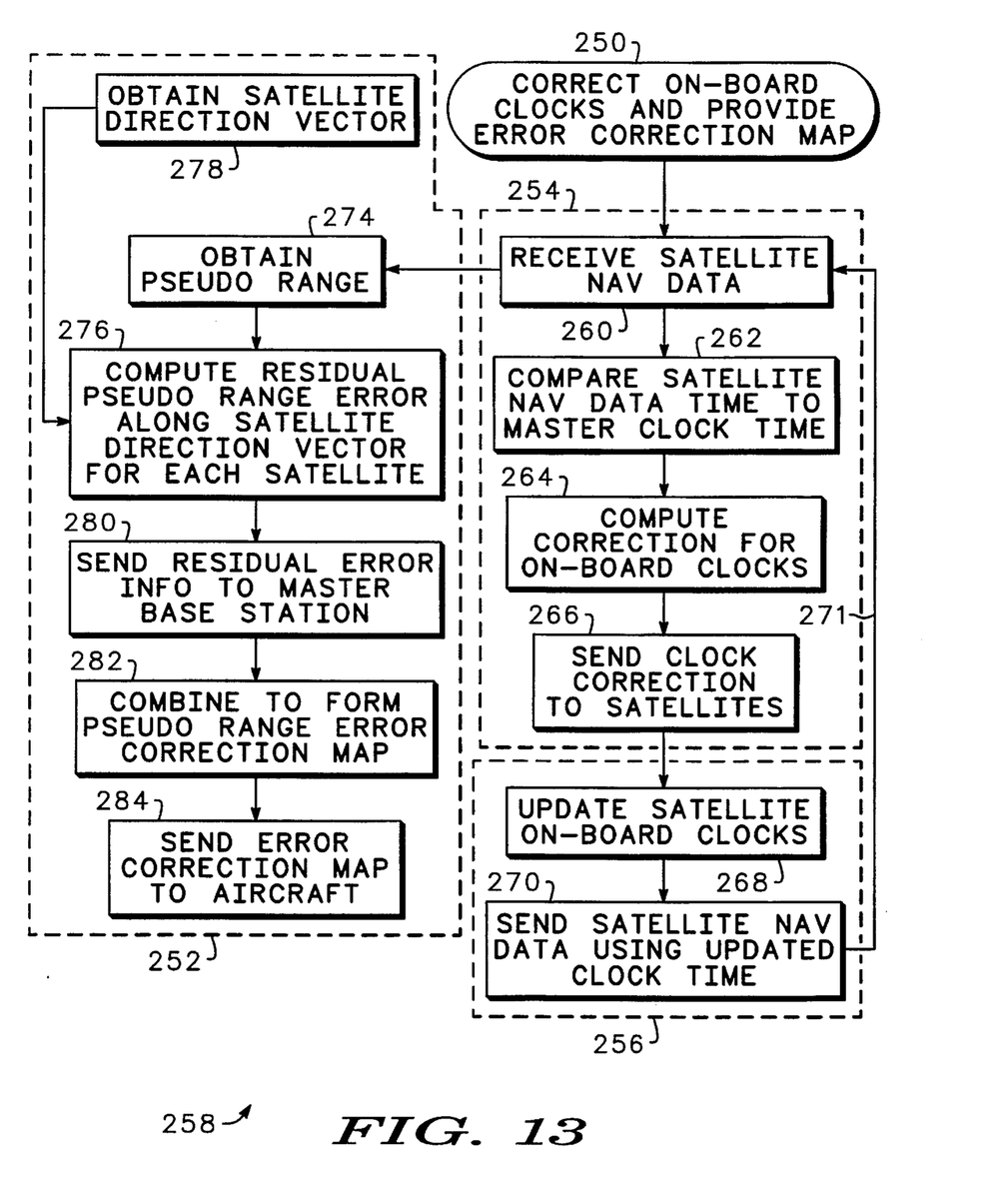
FIG. 13 is a simplified process flow chart illustrating how base stations and satellites cooperate to update the on-board clocks on the satellites and to provide a residual error correction map to the aircraft receiving NAV DATA from the satellites, according to a further embodiment of the present information.

FIG. 13 is a simplified process flow chart illustrating process 250 whereby base stations 26 and satellites 40 cooperate to update on-board clocks 76 on satellites 40 and to provide a residual error correction map to aircraft 28 receiving NAV DATA from satellites 40, according to a further embodiment of the present information. In the preferred embodiment, the steps within dashed outlines 252, 254 are carried out by base stations and the steps within dashed outline 256 are carried out by satellites. The base station portion of process 250 is divided into two subprocesses indicated by dashed outlines 252, 254. The steps within outline 254 in combination with the steps within outline 256 comprise clock compensation feedback arrangement 258 that runs substantially continuously, or at least, at intervals sufficiently frequent to compensate short term clock drift or errors of equivalent effect, e.g., from changes in the satellite signal propagation paths. The purpose of feedback arrangement 258 is to maintain the received satellite NAV DATA signal epochs in precise synchronization with the master base station clock, and thus, compensate for variations in the propagation delay due to satellite orbital perturbations as well as variations in the satellite transmitted signal phase due to drift in the on-board satellite clock.

The purpose of the steps within outline 252 is to generate and send to aircraft 28 a differential residual error correction map which is used by aircraft electronics 108 (see FIG. 8) in the manner described in connection with FIG. 9. This permits aircraft 28 to obtain high precision positional fixes (e.g., about one meter or better) anywhere within the coverage area of satellites 40.

Process 250 comprises step 260 wherein base stations 26 receive NAV DATA signals from satellites 40 in much the same manner that aircraft 28 received NAV DATA signals from satellites 40 in step 132 of FIG. 9. NAV DATA transmitted by satellites 40 is, in general, received by all base stations and all users. In step 262, the received satellite NAV DATA is analyzed by base station processor 90 in much the same manner that conventional GPS signals are analyzed to determine the difference, for each satellite, between on-board clock time and master clock time. For example, the NAV DATA from satellites 40 contains time information based on the time being kept by on-board clocks 76. Because NAV DATA has a predetermined structure, e.g., analogous to GPS signal structure, and because the orbital tracks of satellites 40 are known, base stations 26 can determine the differential between satellite clock time and base station clock time. The time differential is affected by satellite range errors which in GPS-like systems are equivalent to time errors.

In step 264, processor 90 computes a correction to be transmitted to satellites 40 to permit processors 70 in satellites 40 to update their on-board clocks 76 so as to be in synchronism with the master clock 96, or at least to have a known off-set therefrom. In a preferred embodiment, the correction is chosen so as to eliminate both on-board clock drift and first order range errors, caused for example, by orbital variations. This is accomplished, for example, by compensating the on-board satellite clock to force the NAV DATA signal received at the master base station to be synchronized to the master base station clock.

The error determination may be done at each base station 26 or only at the base station serving as the master base station 26' or a combination thereof. Where these steps are performed at multiple base stations the results are desirably combined in the master base station prior to step 266 in which the clock compensation signals are sent to the satellites. The clock compensation signals are conveniently sent via communication and data transceiver 100 or tracking, telemetry and control transceiver 106, where they are received by corresponding transceivers 80 or 86 in satellites 40. In general, the clock correction signals are addressed so that each of satellites 40 can recognize the signal intended for it.

In step 268, satellite electronics 66 receive the clock compensation signal transmitted in step 266 and update on-board clocks 76 based thereon. In step 270, satellites 40 send NAV DATA based upon the updated (compensated) clock time. As indicated by feedback path 271, the NAV DATA are received by base stations 26 (and aircraft 28) and feedback arrangement 258 commences again. In the preferred embodiment, feedback arrangement 258 operates continuously. Persons of skill in the art will understand based on the description herein that time delays can be inserted between various of steps 260–270 in order to control the update rate of feedback arrangement 258. Because of the long propagation delays between base stations 26 and satellites 40 (e.g., about 0.25 sec), an update rate of about a one second is suitable for feedback arrangement 258.

Running in parallel with feedback arrangement 258 is the error correction map generation process shown within outline 252. In general, generation of new error correction maps is needed less frequently than the iterations of feedback arrangement 258. Gross timing and range errors are automatically corrected by feedback arrangement 258. Because satellites 40 are, in general, moving comparatively slowly relative to aircraft 28, the residual propagation errors (which the error correction map is intended to remove) change only slowly. Thus, error map updates need only be transmitted at, for example, $10^{-1}$–$10^{-2}$ times the rate or less at which feedback arrangement 258 iterates, but this is not essential.

In step 274, NAV DATA received in step 260 is used to obtain pseudo ranges between satellites 40 and ground stations 26 in, for example, substantially the same manner as for corresponding GPS signals. In step 276, the pseudo ranges obtained in step 274 are combined with the satellite direction vector information provided by step 278 and compared with the expected ranges based upon knowledge of the satellite orbits and direction vectors and the known positions of ground stations 26 to compute a differential pseudo range error along the satellite direction vectors, for each satellite and, preferably, for each ground station. In step 280, the residual differential error information collected about each satellite by each base station is sent to the base station acting as the master base station and in step 282 the collected error information is combined to form a pseudo range error correction map over the region of earth covered by satellites 40. This error correction map provides, for example, range amounts to be added to or subtracted from the pseudo ranges determined by a user for each satellite at any location within the satellite coverage area, to remove residual NAV DATA range (and positional location) errors.

Based on the foregoing description, it will be apparent to those of skill in the art that the present invention solves many of the problems set forth earlier, and has substantial advantages as pointed out herein, as follows. The invented satellite network provides voice and data communication between planes and between aircraft and ground stations and with remotely located ground facilities. Having the communication, navigation and geolocation functions integrated within the same satellite based communication network greatly simplifies ATC system design, deployment and operation. Thousands of aircraft can be handled within satellite coverage areas encompassing hundreds of millions of square kilometers and more.

The invented system provides high positional accuracy (approaching one meter) over very wide areas ($10^5$ to $10^7$ km² or more) for thousands of aircraft or other objects. The invented system provides high geolocation integrity (i.e., no unfavorable satellite angles). The position of each aircraft is automatically reported with high accuracy to the ATC system using the satellite communication capability or otherwise. The combination of high accuracy over wide areas which is independent of local radar and other classical position determining systems, means that remote instrument landings can be accomplished substantially independent of weather and at any available field no matter whether it is equipped with an instrument landing system or not. Accurate positional information on the aircraft and at the ATC centers provides improved navigational accuracy and less risk of midair or ground (e.g., run way or taxi way) collisions. Further, the above-noted capabilities are provided by an integrated system that uses very few satellites and base stations relative to the area coverage obtained. With all six satellites in the constellations are visible to all users, failure of a single satellite does not result in significant loss of geolocation integrity. This provides a much greater margin of safety than with current GPS approaches, and provides gradual degradation of accuracy in the event of a satellite failure. In addition, because the satellites are in substantially geosynchronous orbits, spare satellites can be conveniently parked within useful range. Further, the specified constellations and orbits make differential geolocation possible over wide areas with very few reference stations, a result not easily obtainable with current GPS systems. In addition, the comparatively small number of satellites and base stations makes the invented system economically more attractive compared to other GPS-like approaches.

While the present invention has been described in terms of particular materials, structures and steps, these choices are for convenience of explanation and not intended to be limiting and, as those of skill in the art will understand based on the description herein, the present invention applies to other choices of materials, arrangements and process steps, and it is intended to include in the claims that follow, these and other variations as will occur to those of skill in the art based on the present disclosure.

We claim:

1. A system for providing location information to users, comprising:

a first group of at least three geolocation information transmitting satellites in substantially geosynchronous independent elliptical first orbits around the Earth, wherein said first orbits are inclined to earth's equatorial plane by at least ten degrees and with orbital parameters providing first closed ground tracks having longitudinal extent greater than zero and less than one hundred and eighty degrees, and each of said first closed ground tracks of said satellites of said first group being substantially common, and said first closed ground tracks defining a predetermined area of coverage wherein said user is located; and a second group of one or more geolocation transmitting satellites in substantially geosynchronous second orbits around the earth, wherein said second orbits provide ground tracks lying substantially outside the first ground tracks and wherein said user obtains non-indeterminate positional fixes from said first group of at least three geolocation information transmitting satellites and from said second group of one or more geolocation transmitting satellites.

2. A system for providing location information to users, comprising, at least six substantially geosynchronous satellites in at least two constellations having different ground tracks, wherein a first constellation comprises a grouping of three or more satellites having independent elliptical orbits with substantially common first closed ground tracks, said first closed ground tracks defining a predetermined area of coverage wherein said user is located and a second constellation comprises a second grouping of one or more satellites with second closed ground tracks, wherein said second ground tracks lie outside said first ground tracks and wherein said satellites transmit location information permitting said users to determine their position when at least four of said satellites are in view.

3. A system for providing location information to users, comprising at least six substantially geosynchronous orbiting satellites transmitting said location information having at least first closed ground tracks and second ground tracks, wherein a first portion of said at least six substantially geosynchronous orbiting satellites having said at least first closed ground tracks have independent elliptical orbits, said first closed ground tracks having longitudinal extent of about 30–180 degrees, and said first closed ground tracks being substantially common and defining a predetermined area of coverage wherein said user is located, said user obtains non-indeterminate positional fixes from said at least six substantially geosynchronous orbiting satellites.

4. The system of claim 3 wherein the longitudinal extent is about 40–100 degrees.

5. The system of claim 3 wherein the longitudinal extent is about 50–70 degrees.

6. The system of claim 3 further comprising communication transceivers in at least two of the satellites, said communication transceivers having a ground footprint which includes at least the first closed ground track.

7. The system of claim 4 further comprising communication transceivers in at least two of the satellites, said communication transceivers having a ground footprint which includes at least the first closed ground tracks and the second ground tracks.

8. The system of claim 3 wherein an angle of inclination of orbits of satellites describing the first closed ground tracks are in a range of 10–70 degrees.

9. The system of claim 8 wherein the angle of inclination of orbits of satellites describing the first closed ground tracks are in a range of 20–40 degrees.

10. The system of claim 9 wherein the angle of inclination of orbits of satellites describing the first closed ground tracks are in a range of 25–35 degrees.

11. The system of claim 3 further comprising communication transceivers for voice and data reception and transmission to and from remotely located users and destinations.

* * * * *